United States Patent [19]

Pirault et al.

[11] Patent Number: 4,884,900
[45] Date of Patent: Dec. 5, 1989

[54] FRACTURE SPLITTING OF LIGHT METAL COMPONENTS

[75] Inventors: Jean P. Pirault, Shoreham by Sea; Mervyn Rowbotham, Aldham; David A. Biggs, Billericay, all of United Kingdom

[73] Assignee: Ford Motor Company, Dearborn, Mich.

[21] Appl. No.: 294,148

[22] PCT Filed: May 1, 1987

[86] PCT No.: PCT/GB87/00293
§ 371 Date: Dec. 27, 1988
§ 102(e) Date: Dec. 27, 1988

[87] PCT Pub. No.: WO87/06509
PCT Pub. Date: Nov. 5, 1987

[30] Foreign Application Priority Data
May 3, 1986 [GB] United Kingdom ............ 8610906

[51] Int. Cl.⁴ .................. F16C 35/00; F16C 33/64
[52] U.S. Cl. ............................ 384/434; 29/413;
74/579 R; 384/503
[58] Field of Search .............. 384/272, 273, 288, 294,
384/429, 430, 432, 434, 503; 74/579 R, 579 E,
593, 594; 29/156.5 A, 413

[56] References Cited

U.S. PATENT DOCUMENTS

| | | | |
|---|---|---|---|
| 2,553,935 | 5/1951 | Parks et al. | 74/579 E |
| 2,703,263 | 3/1955 | Zernov | 29/156.5 A |
| 3,285,098 | 11/1966 | Beveridge . | |
| 3,751,080 | 8/1973 | Bailey et al. | 29/156.5 A |
| 3,994,054 | 11/1976 | Cuddon-Fletcher et al. | 74/579 R |
| 4,240,682 | 12/1980 | Benson . | |
| 4,684,267 | 8/1987 | Fetouh | 384/503 X |
| 4,688,446 | 8/1987 | Isikawa | 29/156.5 A |
| 4,693,139 | 9/1987 | Mukai et al. | 74/579 E |

FOREIGN PATENT DOCUMENTS 551842 3/1943 United Kingdom .
579060 7/1946 United Kingdom .

Primary Examiner—Thomas R. Hannon
Attorney, Agent, or Firm—Joseph W. Malleck; Roger L. May

[57] ABSTRACT

A light metal component formed in a single piece and which has an aperture in the component, the aperture being entirely surrounded by the metal of the component, wherein a fracture zone is incorporated in the metal surrounding the aperture, with a brittle material incorporated in the component at the fracture zone so that the component can be split at the fracture zone, substantially without any ductile deformation, to separate a cap portion from the rest of the component to allow a separate component to be introduced into the aperture, whereupon the cap portion can be reunited with the rest of the component to close the aperture around the separate component.

3 Claims, 1 Drawing Sheet

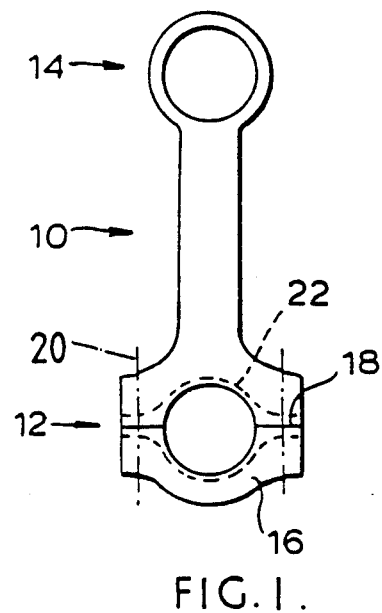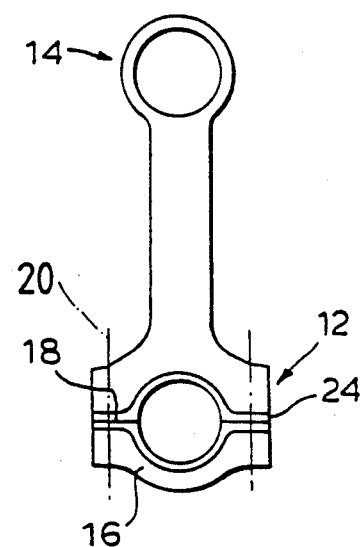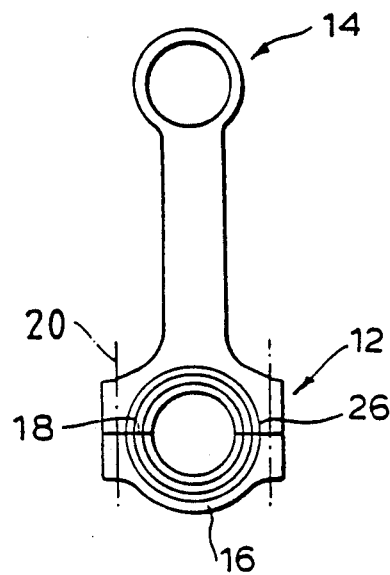

FRACTURE SPLITTING OF LIGHT METAL COMPONENTS

The present invention relates to fracture splitting of light metal components.

Fracture splitting is a known technique used, for example, in the separation of the bearing cap from the rod in an internal combustion engine connecting rod. Connecting rods are normally made in one piece, by casting or forging, and the bearing cap is subsequently separated from the rod to enable the rod to be fitted around a journal of a crankshaft. In order to ensure that the cap and the rod are properly matched, steps are taken to ensure that each cap is always paired with the rod from which it was separated.

Fracture splitting is particularly appropriate for producing this separation. The fractured edges provide, on reassembly, a unique, perfectly keyed and positively located joint thereby eliminating the need for any machining operations.

Fracture splitting has however not been possible with light metal (ie aluminium, magnesium and alloys containing either one of them) components because the inherent ductility of the material results in the fracture edges being distorted so that they do not reassemble as desired.

According to the present invention, there is provided a light metal component formed in a single piece and having an aperture entirely surrounded by the metal of the component, wherein the component can be split to separate a cap portion from the rest of the component and thereby allow a separate component to be introduced into the aperture, whereupon the cap portion can be reunited with the rest of the component to close the aperture around the separate component, characterised in that a brittle material is implanted in the metal surrounding the aperture to form a fracture zone at which the the component can be split substantially without any ductile deformation.

The cap may conveniently be reunited with the rest of the component by bolting the two together.

The brittle material may be in the form of an insert of a brittle metal. Alternatively the component may be implanted with embrittling constituents at the fracture zone.

The brittle metal insert may be a sintered steel insert. Either the component itself or the insert, or both, may be notched to provide a stress-raising crack initiation plane to provide a starting point for the fracture splitting.

Alternatively the brittle metal may be introduced as an armature of wire positioned where the brittleness is needed, with the light metal of the component cast around the wire so that the wire is included in the desired part of the component.

When the brittle material is introduced by implanting embrittling constituents in an aluminium alloy component, the embrittling constituents may, for example, be $FeAl_3$ or $FeMnAl_6$ which will be concentrated at the fracture zone on a macro scale.

A typical application for the invention is in the big ends of light metal engine connecting rods which are used in some engines in preference to steel because of their lighter weight. Another application is in main bearing carriers, again for internal combustion engines.

An additional advantage of the invention in these applications is a greater resistance to expansion. There is a problem when a light metal con rod supports a steel-backed bearing because of the differential rates of expansion. This problem can be ameliorated by forming the con rod with an incorporated brittle material. Furthermore, there are other benefits in terms of increased stiffness and strength.

The invention will now be further described, by way of example, with reference to the accompanying drawing, in which FIGS. 1, 2 and 3 each show a connecting rod for an internal combustion engine adapted to be split by a fracture splitting technique.

The figures show a connecting rod 10 with a big end 12 and a small end 14. This rod is made in one piece from an aluminium alloy by a squeeze casting technique. In order to be able to assemble the big end around a crankshaft journal, with an interposed bearing, it is necessary to split a "bearing cap" 16 from the rod. This splitting is to take place along the line 18.

To reassemble the cap back to the rod, two bolts are used the positions of which are indicated by dotted lines 20.

In order to enable a fracture splitting technique to be used to separate the cap from the rod, it is necessary to reduce the ductility of the aluminium alloy to an extremely low level.

With cast steel components it is known to include stress raising notches along the line where splitting is to occur, and also to locally raise the hardness of the metal by localised heat treatment. Alternatively, the metal may be immersed in a cryogenic liquid and cooled to a very low temperature to encourage brittleness.

Once the necessary brittle state has been achieved in any of these ways, splitting is done by applying a side bending load at the plane to be split.

However with aluminium or magnesium alloys, these measures will not reduce the inherent ductility sufficiently to achieve a break without also deforming the metal which would prevent the fractured surfaces being put together again.

In order to bring down the ductility of the alloy in the fracture zone, it is proposed to either (a) implant embrittling constituents such as $FeAl_3$ or $FeMnAl_6$ in the region 22 accompanied perhaps by appropriate heat treatment to cause the necessary migration of the embrittling constituents into the alloy matrix (FIG. 1), (b) include an insert 24 of brittle material in the connecting rod when this is cast (FIG. 2), or (c) wind an armature of wire 26 made of a brittle material (probably but not necessarily of metal; high modulus fibres may also be possible) and then cast the alloy around this armature (FIG. 3).

In each of these cases, stress raising notches will be provided in the surface of the rod to locate the position where the fracture splitting is to occur.

We claim:

1. A light metal component formed in a single piece and which has an aperture in the component, the aperture being entirely surrounded by the metal of the component, wherein a fracture zone is incorporated in the metal surrounding the aperture, with a brittle material incorporated in the component at the fracture zone so that the component can be split at the fracture zone, substantially without any ductile deformation, to separate a cap portion from the rest of the component to allow a separate component to be introduced into the aperture, whereupon the cap portion can be reunited with the rest of the component to close the aperture around the separate component, said brittle material being in the form of a brittle metal introduced as an armature of wire positioned where the brittleness is needed, with the light metal of the component cast around the wire so that the wire is included in the desired part of the component.

2. A component as claimed in claim 1 and made of an aluminium alloy, wherein the embrittling constituents are $FeAl_3$ or $FeMnAl_6$ which will be concentrated at the fracture zone on a macro scale.

3. A component as claimed in claim 1, wherein either the component itself or the insert, or both, is notched to provide a stress-raising crack initiation plane to provide a starting point for the fracture splitting.

* * * * *